May 15, 1962 G. A. LYON 3,034,145
SINK RETAINING STRUCTURE
Filed July 27, 1959
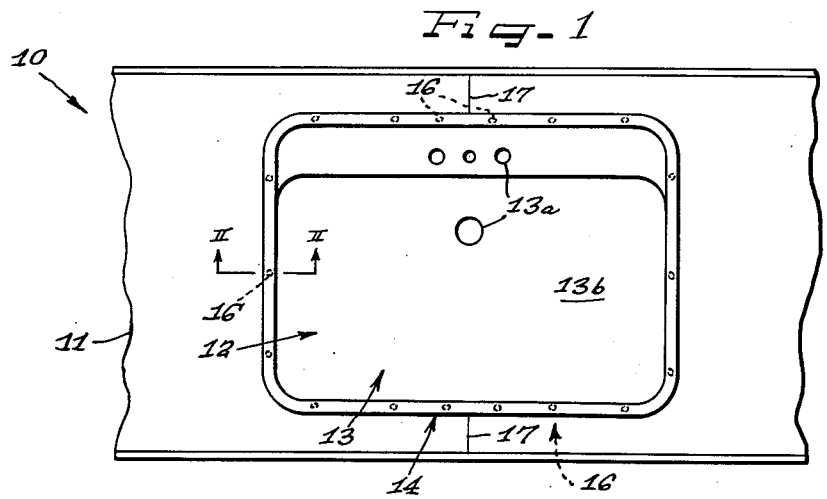
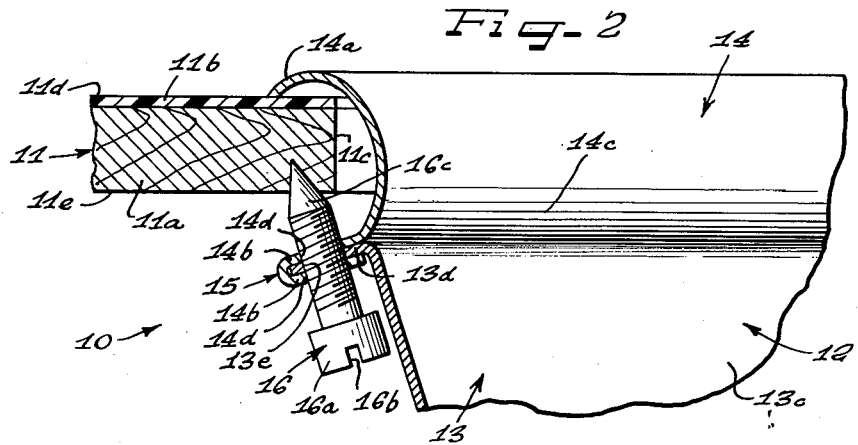
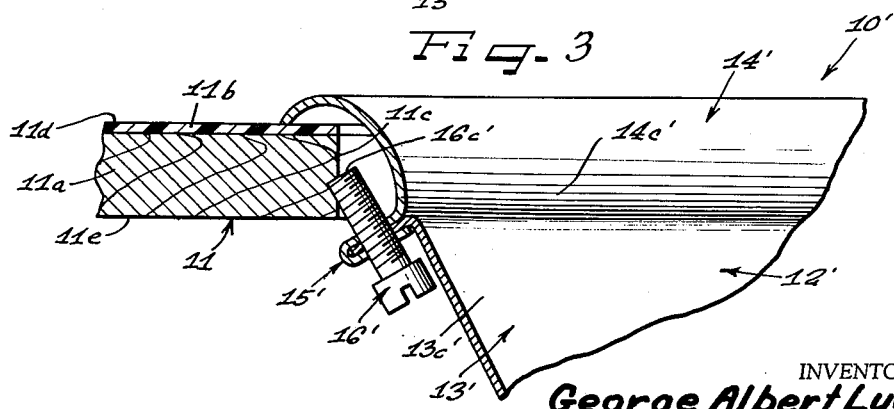
INVENTOR
George Albert Lyon
BY
ATTORNEYS

United States Patent Office 3,034,145
Patented May 15, 1962

3,034,145
SINK RETAINING STRUCTURE
George Albert Lyon, Detroit, Mich., assignor to Lyon Incorporated, Detroit, Mich., a corporation of Delaware
Filed July 27, 1959, Ser. No. 829,795
2 Claims. (Cl. 4—187)

The present invention relates generally to a sink structure. The present invention is more particularly concerned with a sink bowl structure which is adapted to be inserted through an opening in a counter top and secured in assembly with the counter top by means of fasteners which are carried by the sink bowl structure.

The sink bowl structure, as exemplified by the embodiment shown in the drawing, is particularly adapted to be economically manufactured and to be more readily installed in assembly with a counter structure. The sink structure includes an outer top portion or marginal portion which is adapted to bear against the top surface of the counter top as well as projection structure depending outwardly from the side wall of the sink bowl structure below or to one side of the counter top on the opposite side of the counter top with respect to the top portion or outer marginal portion of the sink bowl structure. This projection structure carries fasteners which may be turned into engagement with the counter top in such a way that the outer marginal sink portion is clamped against the counter top and the sink bowl structure is thereby engaged in snug assembly with the counter top or counter structure. The sink bowl structure, as illustrated, comprises a two-piece unit including a ring and a sink bowl which have lapped adjacent margins which are in interlocked assembly together and which provide a water tight juncture. The interlocked margins of the ring and the sink bowl are provided with holes through which the aforesaid fasteners are projected to permit the sink bowl structure to be quickly assembled with a counter top with a minimum of effort. Where the sink bowl structure is made from two pieces including a ring and a sink bowl the pieces may be made from different materials so as to create a very attractive appearing sink bowl structure. As an example, the ring may be made from stainless steel whereas the sink bowl may be made from steel and it may have a coating such as a suitable paint thereby providing a sink bowl structure having contrasting sink bowl portions. It will be appreciated that the shiny stainless steel ring will sharply contrast with the painted area of the sink bowl.

It is an important object of the present invention to provide a new and improved sink bowl structure for attachment with a counter or counter top.

Another important object of the present invention relates to a new and improved sink bowl structure which may be economically manufactured on a large production basis and which may be readily installed with a counter structure with a minimum of effort.

An important feature of the present invention relates to a sink bowl structure having a top portion adapted for lapped engagement on top of a counter top and having projection structure depending from the side wall of the sink bowl structure on the underside of the counter structure and which projection structure carries fasteners for clamping the top or lapped portion as well as the sink bowl structure in assembly with the counter structure.

Other objects and features of the present invention will fully become apparent in view of the following detailed description taken in conjunction with the accompanying drawings illustrating several embodiments and in which:

FIGURE 1 is a fragmentary top plan view of a sink structure;

FIGURE 2 is an enlarged fragmentary cross-sectional view taken substantially on the line II—II looking in the direction indicated by the arrows, as seen in FIGURE 1; and FIGURE 3 is an enlarged fragmentary cross-sectional view similar to FIGURE 2 only showing a modified type of sink bowl structure.

The reference numeral 10 in FIGURES 1 and 2 indicates generally a sink structure which sink structure includes a counter structure or counter top 11 and a sink bowl structure 12. The counter structure, as illustrated, is of a laminated type including a lower wood layer 11a and an upper synthetic plastic layer 11b which are in bonded assembly together. The counter structure is provided with a vertical annular counter top edge area 11c defining an opening through which the sink bowl structure 12 is adapted to be projected. The counter top 11 further includes upper and lower counter top surfaces 11d and 11e.

The sink bowl structure 12 is provided with a sink bowl 13 and a supporting frame rim ring 14 which are joined together in an outwardly projecting juncture flange structure 15. Movable fastener structure, advantageously comprising screw fasteners 16 are carried by the juncture flange structure for securing the sink bowl 12 to the counter top 11.

The sink bowl 13 is provided with holes 13a for the sink drain outlet and the sink fittings.

The sink bowl 13 is also provided with a sink bowl bottom area 13b, a sink bowl vertical side wall area 13c and an upper end marginal outwardly turned rim flange portion 13d thereabout. This flange 13d has spaced holes 13e extending therethrough so that the fasteners 16 my be projected therethrough.

The ring 14 includes an outer downturned counter top engaging marginal area 14a as well as a looped inner marginal underturned return bent flange portion 14b. The ring margins 14a and 14b are joined together by an arched, arcuate antisplash guard inwardly protruding ring portion 14c which is bulged slightly inwardly of the side wall 13c to deflect splash droplets back on to the bottom area 13b of the sink rather than letting the droplets be projected out of the sink bowl structure 13. Annular edges defining holes 14d are disposed in coaxial relation with the sink flange hole 13e so that the fastener 16 may be projected through the contiguous marginal flanges of the rim flange and the bowl through the projection structure 15.

Where the sink bowl structure 12 is manufactured from two pieces, as shown in the drawings, the adjacent sink and ring margins 13d and 14b are engaged in interlocked assembly. One of the margins is provided with a looped portion while the other of the margins is provided with an annular flange engaged within the looped portion. As shown, the ring 14 is provided with the looped portion 14b and the sink bowl 13 is provided with the flange 13d which is engaged and crimped within the looped portion 14b on the ring. These interlocked sink and ring portions provide a water-tight juncture or joint between the sink bowl 13 and the ring.

After the sink bowl 13 and the ring 14 have been joined together, the projection structure 15 is preferably drilled or punched and tapped at annularly spaced intervals so as to provide the aligned holes 13e and 14d so that the fasteners 16, comprising screws, may be threaded therethrough.

To facilitate assembly of the sink bowl structure 12 therewith, the counter structure 11 may be formed in two complementary parts, each of which has part of the opening 11c, and joined together at 17 about the sink bowl within the groove defined by the frame ring portion 14. The sink bowl structure is thereby projected through the counter opening defined by the annular edge 11c and the screws are rotated until they are engaged against the counter structure in such a way that the sink bowl structure is clamped in assembly with the counter structure. The outer margin of the sink bowl portion 14a is preferably snugly engaged with the top surface 11d of the counter in such a way that moisture and materials cannot readily pass therebetween.

The fastener 16 shown in FIGURE 2 has a head 16a with a screwdriver slot 16b enabling the fastener to be turned into and out of engagement with the underneath surface 11e of the counter 11. The fastener 16 has a pointed end 16c to permit the fasteners to be more readily attached to the counter structure.

In FIGURE 3, a modified sink structure 10' is shown. The sink structure 10' includes a counter structure 11 which is identical to the counter structure shown in the first form as well as a sink bowl structure 12' which is substantially identical to the sink bowl structure shown in FIGURE 2. The sink bowl structure 12' includes a sink bowl 13' and a ring 14'. The sink bowl 13' has a side wall area 13c' which is disposed at a greater angle of inclination than the side wall 13c of the sink bowl 13. Also, the side wall area 13c' is disposed in closer proximity at its upper edge to the underneath surface 11e of the counter. By this arrangement the ring 14' may be configurated in a slightly different manner whereby its arcuate anti-splash guard inwardly protruding ring portion 14c' is disposed more in alignment with the side wall 13c than is the case as shown in the first embodiment. When fasteners 16' are projected through the juncture flange 15' the edges of blunt ends 16c' of the fasteners may be engaged with the vertical annular counter top edge area 11c as opposed to the lower counter top surface 11e. The clamped relationship of the sink bowl structure 12 with respect to the counter structure 11 is thereby modified since counter surfaces 11b and 11c are clampingly engaged instead of counter surfaces 11b and 11e as in FIGURE 2.

The sink bowl structure 12' may be assembled with the counter structure 11 in the same manner as previously described, but because of greater clearance of the juncture flange 15' relative to the opening 11e the counter top may be in one piece and assembled inverted or right side up by relative axial movement.

It will be understood that modifications and variations may be effected without departing from the scope of the novel concepts of the present invention.

I claim as my invention:

1. A sink bowl structure including a ring and sink bowl having their adjacent margins interlocked in water tight assembly and with the adjacent margins projecting away from the sink bowl, and annularly spaced screws mounted on said adjacent margins and angled in an upward direction toward a counter structure and rotatable for securing the sink bowl structure to a counter structure, the ring having an outer ring margin for engagement with a counter top and with the interlocked margins as well as said screws being disposed underneath the outer ring margin, the inner ring margin having a looped portion and the sink margin comprising a flange engaged in the looped portion to maintain the sink bowl and the ring in interlocked assembly together, said screws being threaded transversely through the looped portion and the flange of said ring and said sink bowl.

2. In combination, a sink bowl structure and a counter top, the counter top having a vertical counter top edge area defining a counter top opening as well as upper and lower counter top surfaces, the sink bowl structure including a ring and a sink bowl which have their adjacent margins interlocked in water tight assembly and with the adjacent margins projecting away from the sink bowl, the adjacent margins being of such dimension as to pass freely through the counter opening defined by the counter top edge area and annularly spaced screws threaded through said adjacent margins retainingly engaged against the counter top securing the sink bowl structure in assembly with the counter top, the ring having an outer ring margin clamped against the upper counter top surface to resist dirt and moisture from passing therebetween and with the adjacent margins underlying the outer ring margin.

References Cited in the file of this patent

UNITED STATES PATENTS

| | | |
|---|---|---|
| 2,475,112 | Stanitz | July 5, 1949 |
| 2,514,740 | Brown | July 11, 1950 |
| 2,628,365 | Drain | Feb. 17, 1953 |
| 2,778,032 | Meehan | Jan. 22, 1957 |
| 2,812,521 | Skinner | Nov. 12, 1957 |
| 2,843,855 | Hammer | July 22, 1958 |
| 2,846,695 | Hartog | Aug. 12, 1958 |
| 2,921,320 | Lantz | Jan. 19, 1960 |

FOREIGN PATENTS

| | | |
|---|---|---|
| 183,532 | Austria | Oct. 25, 1955 |